United States Patent
Lee et al.

(10) Patent No.: US 9,440,539 B2
(45) Date of Patent: Sep. 13, 2016

(54) ENERGY STORAGE APPARATUS FOR RAILWAY VEHICLES BY ADOPTING A BIDIRECTIONAL DC-DC CONVERTER

(76) Inventors: Eun Kyu Lee, Cheongju-Su (KR); Yong-Woo Lee, Cheongju-Si (KR); Tae-Suk Kim, Cheongju-Si (KR); Kyoung-Min Kwon, Jeungpyeong-Gun (KR); Jung-Ho Yoo, Chungju-Si (KR)

( * ) Notice: Subject to any disclaimer, the term of this patent is extended or adjusted under 35 U.S.C. 154(b) by 703 days.

(21) Appl. No.: 13/418,573

(22) Filed: Mar. 13, 2012

(65) Prior Publication Data
US 2013/0175855 A1 Jul. 11, 2013

(30) Foreign Application Priority Data
Jan. 5, 2012 (KR) .................. 10-2012-0001618

(51) Int. Cl.
| B60L 1/00 | (2006.01) |
| B60L 7/16 | (2006.01) |
| H02J 7/34 | (2006.01) |
| B60L 9/00 | (2006.01) |
| B60L 11/00 | (2006.01) |
| B60L 15/00 | (2006.01) |
| B60M 3/06 | (2006.01) |
| H02M 3/158 | (2006.01) |

(52) U.S. Cl.
CPC .. B60L 1/00 (2013.01); B60L 7/16 (2013.01); B60L 9/00 (2013.01); B60L 11/005 (2013.01); B60L 15/002 (2013.01); B60L 15/007 (2013.01); B60M 3/06 (2013.01); H02J 7/345 (2013.01); B60L 2200/26 (2013.01); B60L 2210/12 (2013.01); B60L 2210/14 (2013.01); B60L 2270/147 (2013.01); B60L 2270/40 (2013.01); H02M 3/1582 (2013.01); Y02T 10/7022 (2013.01); Y02T 10/7077 (2013.01); Y02T 10/7225 (2013.01); Y02T 10/7233 (2013.01); Y02T 90/16 (2013.01)

(58) Field of Classification Search
CPC ...... B60L 1/00; B60L 11/005; B60L 15/002; B60L 15/007; B60L 7/16; B60L 9/00; B60L 2200/26; B60L 2210/12; B60L 2210/14; B60L 2270/147; B60L 2270/40; B60L 11/14; H02J 7/345; B60M 3/06; H02M 3/1582; Y02T 10/7022; Y02T 10/7225; Y02T 10/7233; Y02T 90/16; Y02T 10/7005; Y02T 10/7077; B60R 16/03; B60R 16/0315
USPC .................................................... 307/9.1, 46
See application file for complete search history.

(56) References Cited

U.S. PATENT DOCUMENTS

| 2011/0001464 A1* | 1/2011 | Kondo et al. ................. 323/312 |
| 2011/0260690 A1* | 10/2011 | Kojori et al. ................. 320/134 |
| 2012/0013181 A1* | 1/2012 | Kim et al. ..................... 307/9.1 |
| 2012/0025614 A1* | 2/2012 | Taimela et al. ................. 307/65 |
| 2012/0163035 A1* | 6/2012 | Song et al. ..................... 363/17 |

* cited by examiner

Primary Examiner — Thienvu Tran
Assistant Examiner — Brian K Baxter (57) ABSTRACT

An energy storage apparatus has developed for railway vehicles by adopting a bidirectional DC-DC converter to increase the efficiency of charge/discharge, comprising that; a power receiving unit, filter unit, charging unit storage unit having a plurality of super-capacitors, capacitor monitoring unit, a plurality of bidirectional DC-DC converters arranged in parallel, and voltage detector electrically connected to the filter unit, current detector for detecting the currents flowing. The controller further comprises; an analog interface board, signal identifying board, signal control board, digital output contact unit, communicating board, PWM control board, optical output board, external gate driver. The PWM control board includes; a sensor input circuit, A/D converter, calculation unit, calculation control processor, and power monitoring unit. It is easy to add a storage unit including supercapacitor in a form of box module for increasing capacity and efficient of charging/discharging of the storage unit through various sensors and signal checking.

10 Claims, 6 Drawing Sheets

ENERGY STORAGE APPARATUS FOR RAILWAY VEHICLES BY ADOPTING A BIDIRECTIONAL DC-DC CONVERTER

BACKGROUND OF THE INVENTION

1. Field of the Invention

The present invention relates to an energy storage apparatus for railway vehicles by adopting a bidirectional DC-DC converter. More particularly, the energy storage device for railway vehicle is adopting the bidirectional DC-DC converter, which has increased the efficiencies of the charge/discharge. The design of controller is associated the economical operation to increase the efficiency and convenience through the innovation of the function and configuration, so that the capacity of the energy storage is increased.

2. Related Prior Art

The worldwide industrialization has rapidly increased the oil consumption. As a result, our environment has changed. Due to increase the pollutants in our environment, the world's climate has rapidly warmed. To make the matter worse, the natural resources, such as the fossil fuel energy in the world is becoming depleted. Thus, the depletion of natural resources has caused to raise the oil price steeply. Because the escalation of oil consumption causes to increase the carbon-dioxide in our atmosphere, the Kyoto protocol was established to prevent the global warming. As an urgent project, the research has performed for recycling the energy to reduce the emission of carbon monoxide.

Under such circumstances, the natural energy, such as a wind, tide, solar, or water energy has investigated for utilizing in our life. The new technology has developed to utilize the natural energy for applying in our life. However, the new technology has intensively developed to increase the efficiency. The conventional energy generation device and the storage systems have innovated to improve the certain problems of energy loss for minimizing the loss rate.

In a modern subway, some of trains employ a regeneration brake system to save energy. When the subway train is decelerated, the regeneration brake system converts kinetic energy to the electrical energy and accumulates the converted electric energy. The regeneration brake system is not only reducing the power consumption of the entire system, but also preventing the noise generation by the frictions of brake and wearing of the brake shoes. Regeneration brake system has increasingly applied to the modern train because of such an advantage.

However, the conventional regeneration brake system has a problem of the efficiency of the charging/discharging through the energy storage components. Because the controller of the conventional energy storage apparatus is limited in the function, the conventional controller has merely performed to check the voltage or current, while it is monitoring supercapacitors as the major energy storage components without monitoring the operation of the device.

The regeneration brake system of the conventional energy storage apparatus has a problem of the DC/DC converter and a storage medium. They should be developed for increasing the capacity and efficiency of the energy storage apparatus. For example, when the demand is increased, the capacity of the energy storage apparatus associated with the DC/DC converter and the storage medium from 750V and 10 MJ to 750V and 15 MJ, it is not possible to produce the energy storage apparatus with capacity of 750V and 15 MJ by simply modifying the existing regeneration power storage system with capacity of 750V and 10 MJ. Thus, it is required research to develop and manufacture a new regeneration power storage system having 750V and 15 MJ.

When a 750V, 20 MJ storage medium is needed, a recently developed technology connects a plurality of 750V, 10 MJ storage media to achieve the 750V, 20 MJ storage medium, thereby increasing use efficiency of existing components.

However, an energy storage apparatus which employs such technology needs to include a plurality of units for almost all components (for example, charging units, filter units, current and voltage detectors, and controllers, DC/DC converters, and storage media) and also needs to include an additional current balancing controller to achieve current balancing. Therefore, the energy storage apparatus has problems in that it is necessary to include an additional component such as the current balancing controller without advantages such as a small number of parts and a small volume.

SUMMARY OF THE INVENTION

Therefore, the present invention has been made in view of the above problems, and it is an object of the present invention to provide an energy storage apparatus for urban railways using a bidirectional DC-DC converter, which increases charge and discharge efficiency through design of a controller taking into consideration operation of associated devices and increases economic efficiency and use convenience through change or addition of a minimal configuration for energy storage capacity variation or increase.

In accordance with the present invention, the above and other objects can be accomplished by the provision of an energy storage apparatus for urban railways using a bidirectional DC-DC converter, the energy storage apparatus including a power receiving portion that is electrically connected to an overhead line to receive power and that includes a disconnector therein, a filter unit that is electrically connected to the overhead line to remove high frequency components, a charging unit that is electrically connected between the overhead line and the filter unit to prevent excess current from flowing into the filter unit during charging of a capacitor of the filter unit, the charging unit including a block switch that opens and closes the electrical connection between the charging unit and the overhead line, at least one storage unit including a plurality of supercapacitors to store electrical energy, at least one capacitor monitoring unit that monitors measurements of capacity, input/output current, and power of the storage unit and outputs a monitoring result to a controller, a plurality of bidirectional DC-DC converters provided in parallel, the bidirectional DC-DC converters being electrically connected between the filter unit and the storage unit and being controlled by turning on or off first to sixth transistors according to a control signal, a voltage detector electrically connected to the filter unit to detect voltage of the overhead line, a current detector that detects the amount of current flowing into the filter unit and outputs the same to the controller, and the controller that receives the current and voltage of the overhead line detected by the current detector and the voltage detector and outputs an on/off control signal to each of the first to sixth transistors of the bidirectional DC-DC converters.

Preferably, the number of the at least one capacitor monitoring unit is equal to the number of the bidirectional DC-DC converters.

Preferably, the number of the at least one storage unit is equal to the number of the bidirectional DC-DC converters.

Preferably, the controller includes an analog interface board that receives a detected DC link voltage and supercapacitor voltage in real time from a PT unit and receives a DC link current and a supercapacitor charging and discharging current from a CT unit, a signal identification board that is provided in parallel with the analog interface board and identifies a feedback signal of a contactor, a fuse contact, a temperature contact, and a switch contact of a front panel and performs drive sequence and guard operations of the controller, a signal control board that receives a signal from the analog interface board and the signal identification board and performs sequence and guard operations and communication operations of the apparatus, a digital output contact portion that receives a signal from the signal control board and outputs a contact signal, a communication board that receives a signal from the signal control board and performs communication with a GP monitor and also performs communication with a supercapacitor monitoring unit, a PWM control board that receives a signal from each of the analog interface board and the signal control board and provides a PWM pulse signal, an optical output board that receives the PWM pulse signal from the PWM control board and converts the PWM pulse signal into a PWM optical signal, and an external gate driver that receives the PWM optical signal from the optical output board and generates an external gate drive signal.

Preferably, the PWM control board includes a sensor input circuit that receives an analog signal, an A/D converter that converts an output signal from the sensor input circuit into a digital signal, a calculation unit that receives, as inputs, a reference malfunction value and an output signal of the sensor input circuit and outputs a malfunction detection signal and an interrupt request signal, a calculation control processor that receives an output signal of the calculation unit, creates a charge and discharge current instruction, generates a pulse pattern of a bidirectional chopper, and controls a duty ratio of the chopper, and a power monitoring unit that monitors power state.

Preferably, the signal control board performs communication with another board, a main circuit, and a TMS unit and stores general drive information and a malfunction record and also stores state information of each part in an NVSRAM when the energy storage apparatus malfunctions.

Preferably, the signal identification board includes an input circuit that receives a 100V input signal, a surge blocking unit that is connected to an output terminal of the input circuit to block surge in the input signal, a filter circuit that filters an output signal of the surge blocking unit, and an insulation circuit that insulates the signal identification board from external signals.

Preferably, the digital output contact portion includes an insulation circuit for separating output signals of a motherboard from external signals, and a relay driver for driving a contactor relay.

Preferably, the optical output board includes an optical signal converter that receives 12-channel gate PWM signals from the PWM control board and converts the same into optical signals to drive the gate driver to turn a corresponding IGBT on or off.

Preferably, the controller sequentially activates GCK, MCB, and HSCB units when 220V AC power is applied to the controller and each contactor is in normal state, turns a CHK unit on to enter an initial charging mode of the supercapacitors for charging and discharging when FC voltage exceeds a reference voltage, and identifies, when initial charging is completed, an operating mode of the supercapacitors according to a voltage state of the overhead line and alternately drives the bidirectional DC-DC converters in a buck mode and a booster mode.

The energy storage apparatus for urban railways using a bidirectional DC-DC converter according to the present invention has advantages in that it is possible to easily add a storage unit including supercapacitors in the form of a box module as capacity increases or changes and it is possible to achieve accurate and efficient charging and discharging of the storage unit through various sensors and signal checks (inspections).

DETAILED DESCRIPTION OF THE PREFERRED EMBODIMENTS

Embodiments of the present invention will now be described in detail with reference to the drawings.

Figure 1:
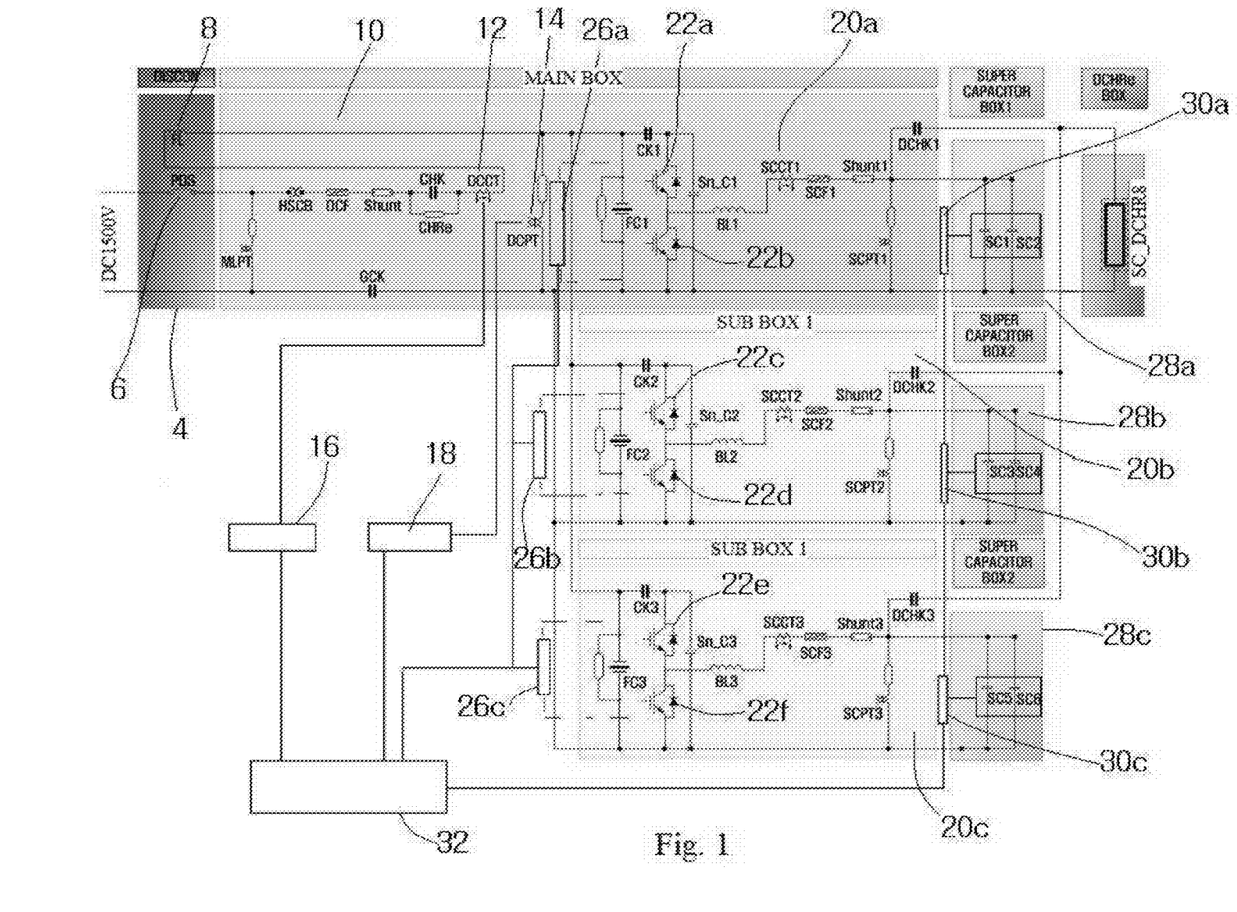
FIG. 1 is a circuit diagram of an energy storage apparatus for urban railways using a bidirectional DC-DC converter according to an embodiment of the present invention.

FIG. 1 is a circuit diagram of an energy storage apparatus for urban railways using a bidirectional DC-DC converter according to an embodiment of the present invention.

Referring to FIG. 1, the energy storage apparatus 2 for urban railways using a bidirectional DC-DC converter according to an embodiment of the present invention increases charge and discharge efficiency through design of a controller taking into consideration operation of associated devices and increases economic efficiency and use convenience through change or addition of a minimal configuration for energy storage capacity variation or increase.

More specifically, the energy storage apparatus 2 for urban railways using a bidirectional DC-DC converter according to an embodiment of the present invention includes a power receiving portion 4, a filter unit 8, and storage units 28a, 28b, and 28c. The power receiving portion 4 is electrically connected to an overhead line to receive power and includes a disconnector 6 therein. The filter unit 8 is electrically connected to the overhead line to remove high frequency components. The storage units 28a, 28b, and 28c include a plurality of supercapacitors to store electrical energy.

The energy storage apparatus 2 for urban railways using a bidirectional DC-DC converter according to an embodiment of the present invention also includes a plurality of bidirectional DC-DC converters 20a, 20b, and 20c, a voltage detector 18, a current detector 16, and a controller 32. The bidirectional DC-DC converters 20a, 20b, and 20c are provided in parallel and are electrically connected between the filter unit 8 and the storage units 28a, 28b, and 28c. The bidirectional DC-DC converters 20a, 20b, and 20c are controlled by turning on or off first to sixth transistors 22a to 22f according to a control signal. The voltage detector 18 is electrically connected to the filter unit 8 to detect voltage of the overhead line. The current detector 16 detects the amount of current flowing into the filter unit 8 and outputs the same to the controller 32. The controller 32 receives the current and voltage of the overhead line detected by the current detector 16 and the voltage detector 18 and outputs an on/off control signal to each of the first to sixth transistors 22a to 22f of the bidirectional DC-DC converters 20a, 20b, and 20c.

The energy storage apparatus 2 for urban railways using a bidirectional DC-DC converter according to an embodiment of the present invention may further include a plurality of capacitor monitoring units 30a, 30b, and 30c and a charging unit 10. The capacitor monitoring units 30a, 30b, and 30c monitor measurements of capacity, input/output current, and power of the storage units 28a, 28b, and 28c and output the monitoring result to the controller 32. The charging unit 10 is electrically connected between the overhead line and the filter unit 8 to prevent excess current from flowing into the filter unit 8 during charging of a capacitor of the filter unit 8 and includes a block switch that opens and closes the electrical connection between the charging unit 10 and the overhead line.

Reference numerals 12 and 14 that are not described above denote a current sensor and a voltage sensor, respectively.

The controller 32 in each energy storage module configured as described above opens the block switch of the charging unit when excess current is detected by the current detector. In a charging mode, the controller 32 outputs a control signal for turning the 1st, 3rd, and 5th transistors off when the storage unit has been fully charged. In a power supply mode, the controller 32 outputs a control signal for turning the 2nd, 4th, and 6th transistors off to control charging and discharging of the storage unit when a voltage input from the capacitor monitoring unit is less than or equal to a reference voltage.

The disconnector 6 includes an electric disconnector for connecting or disconnecting the main circuit to or from the secondary side of a substation upon ESS maintenance and repair or inspection and also includes a 64P relay, which is the same ground relay as that of an existing substation facility, and an input smoothing filter reactor.

The disconnector 6 safely and reliably separates and reconnects an overhead line voltage from and to the energy storage apparatus when the energy storage apparatus is subjected to maintenance and repair and inspection of malfunction. The disconnector 6 can be operated to perform such separation and reconnection simply by pressing on and off buttons through an RS relay and a switch included in the disconnector.

Figure 2:
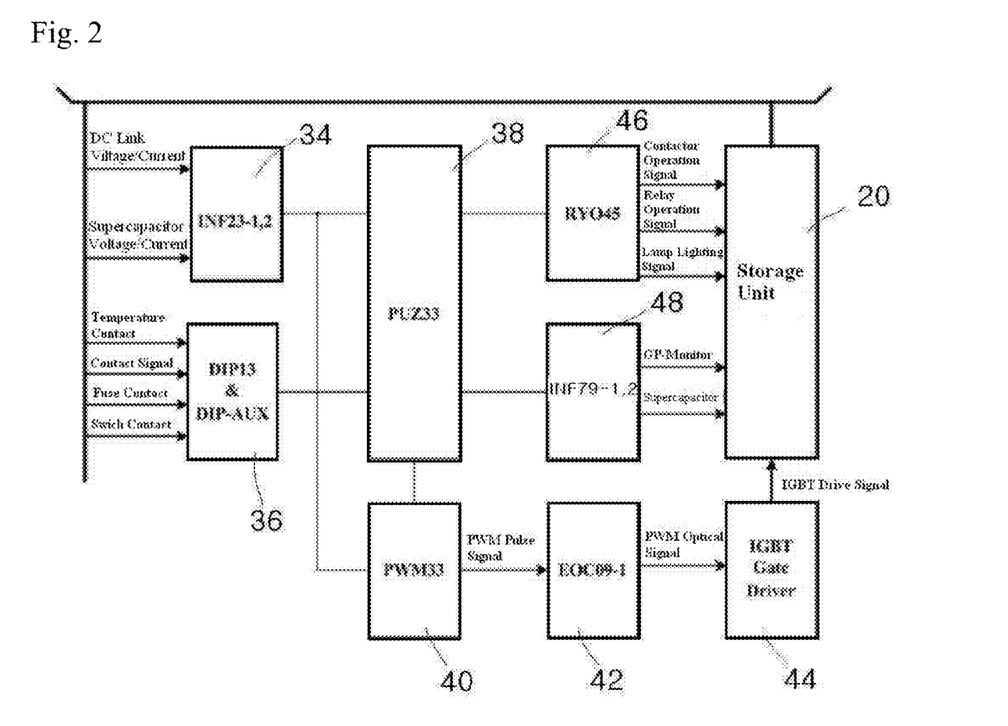
FIG. 2 is a block diagram of a controller included in the energy storage apparatus for urban railways using a bidirectional DC-DC converter according to an embodiment of the present invention.

FIG. 2 is a block diagram of a controller included in the energy storage apparatus for urban railways using a bidirectional DC-DC converter according to an embodiment of the present invention.

Referring to FIG. 2, the controller 32 included in the energy storage apparatus 2 for urban railways using a bidirectional DC-DC converter according to an embodiment of the present invention includes an analog interface board (INF23-1, 2) 34, a signal identification board (DIP13 & DIP-AUX) 36, a signal control board (PUZ33) 38, a digital output contact portion (RYO45) 46, a communication board (INF79) 48, a PWM control board (PWM33) 40, an optical output board (EOC09-1) 42, and an external gate driver (IGBT Gate Driver) 44. The analog interface board 34 receives a detected DC link voltage and supercapacitor voltage in real time from a PT unit and receives a DC link current and a supercapacitor charging and discharging current from a CT unit. The signal identification board 36 is provided in parallel with the analog interface board 34 and identifies a feedback signal of a contactor, a fuse contact, a temperature contact, and a switch contact of a front panel and performs drive sequence and guard operations of the controller 32. The signal control board 38 receives a signal from the analog interface board 34 and the signal identification board 36 and performs sequence and guard operations and communication operations of the system. The digital output contact portion 46 receives a signal from the signal control board 38 and outputs a contact signal. The communication board 48 receives a signal from the signal control board 38 and performs communication with a GP monitor and also performs communication with the supercapacitor monitoring units 30a, 30b, and 30c. The PWM control board 40 receives a signal from each of the analog interface board 34 and the signal control board 38 and provides a PWM pulse signal. The optical output board 42 receives the PWM pulse signal from the PWM control board 40 and converts the PWM pulse signal into a PWM optical signal. The external gate driver 44 receives the PWM optical signal from the optical output board 42 and generates an external gate drive signal.

More specifically, the controller 32 is located in the main box to perform all sequence, control, guard operations and communication functions of the system.

A 32-bit, high-performance microprocessor (TMS320VC33) is used to perform such functions of the controller 32. The controller 32 is designed such that boards are classified and arranged by functions to facilitate system extension.

First, the INF23-1/2 board is an analog interface board wherein an INF23-1 board receives a detected DC link voltage and a supercapacitor voltage in real time from the PT unit of the system and an INF23-2 board receives a DC link current and a supercapacitor charging and discharging current from the CT unit of the system.

The ISO26 board is designed to monitor control sequence and analog values of the controller using a DA converter. The DIP13 & DIP-AUX board identifies a feedback signal of a contactor of the system, a fuse contact, a temperature contact, and a switch contact of the front panel and performs drive sequence and guard operations of the controller 32 using the identified results. A total of 32 contacts may be used as such digital contacts.

The RYO45 board may output a total of 8 digital output contact signals and perform functions such as a function to drive exciting coils of the relay and the contactor or a function to turn on a lamp of the front panel.

The EOC09 board is an optical output board that functions to convert a PWM pulse signal that is provided by the PWM33 board into an optical signal and transmits the optical signal to the external gate driver (IGDU). The purpose of optical conversion is to avoid the influence of externally generated electrical noise.

The INF79 board is a communication board that is designed such that the communication interface can be changed to RS-485/422 according to setting of jumper pins therein. The INF79 board may use up to 2 channels, channel A and channel B. In the current system, channel A uses an RS-422 communication scheme to perform communication with the GP monitor provided on the front side of the main device and channel B uses an RS-485 communication scheme to perform communication with the supercapacitor status monitoring module.

All signals of such external interface devices are transmitted to the PWM33 board and the PUZ33 board to perform control, sequence, and guard operations. The PUZ33 board manages sequence, guard, and communication operations of the apparatus and is controlled using 2 processors. The PWM33 board receives sequence-related information of the PUZ33 board through a DPRAM and performs control functions of a power conversion device.

Figure 3:
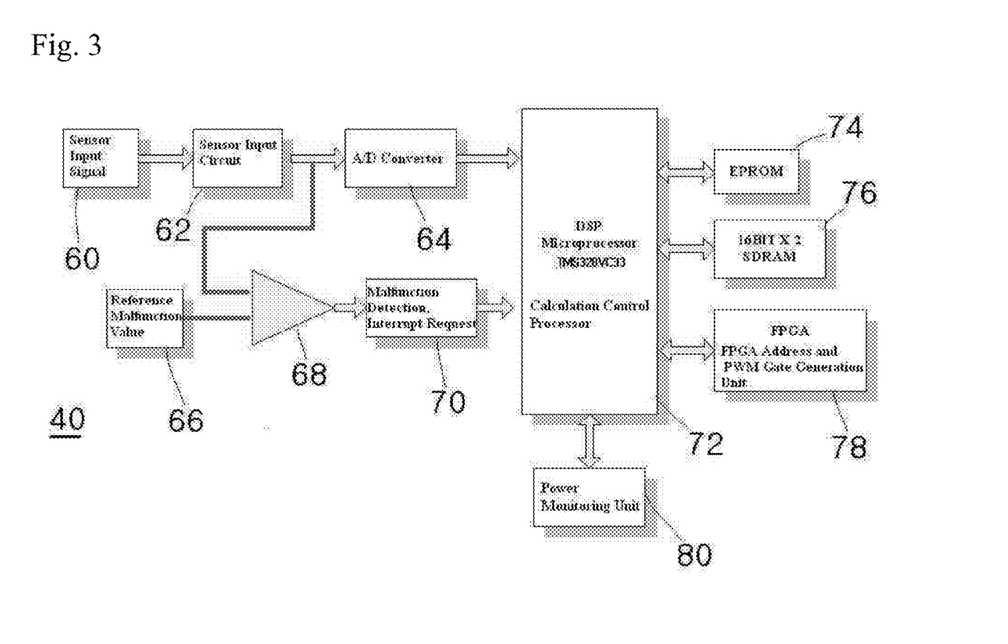
FIG. 3 is a detailed block diagram of a PWM control board included in the controller of the energy storage apparatus for urban railways using a bidirectional DC-DC converter according to an embodiment of the present invention.

FIG. 3 is a detailed block diagram of a PWM control board included in the controller of the energy storage apparatus for urban railways using a bidirectional DC-DC converter according to an embodiment of the present invention.

Referring to FIG. 3, the PWM control board (PWM33) 40 includes a sensor input circuit 62, an A/D converter 64, a calculation unit 68, a calculation control processor 72, and a power monitoring unit 80. The sensor input circuit 62 receives an analog signal 60. The A/D converter converts an output signal from the sensor input circuit 62 into a digital signal. The calculation unit 68 receives, as inputs, a reference malfunction value and an output signal of the sensor input circuit 62 and outputs a malfunction detection signal and an interrupt request signal. The calculation control processor 72 receives an output signal of the A/D converter 64 and an output signal of the calculation unit 68, creates a charge and discharge current instruction, generates a pulse pattern of a bidirectional chopper, and controls the duty ratio of the chopper. The power monitoring unit 80 monitors power state.

Specifically, the PWM33-1 CARD uses a TMS320VC33 processor from Texas Instruments Inc., which is a high-performance 32-bit digital signal processor, as a main calculation unit (arithmetic unit) for executing a control algorithm in real time. In addition, a flash memory is used as the memory to allow a program to be directly downloaded to the ROM to facilitate maintenance and repair.

This board serves as a central part of the energy storage apparatus and thus implements various processes by software using a 32-bit DSP. This board receives various analog signals and creates a charge and discharge current instruction for the energy storage apparatus and generates a pulse pattern of the bidirectional chopper. The board has a function to control the duty ratio of the chopper in order to control a varying input overhead line voltage at a regular DC voltage A PWM pulse waveform generated by this board is transmitted to the EOC09 board and is then converted into an optical signal which is used to drive each gate driver, thereby turning the IGBT on or off.

Figure 4:
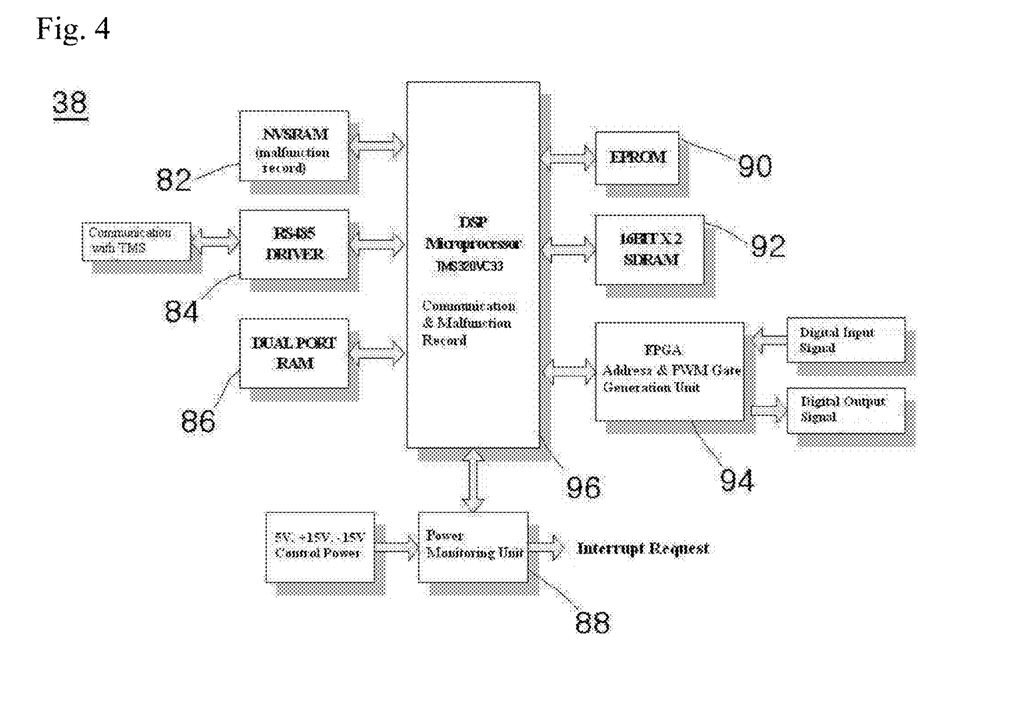
FIG. 4 is a detailed block diagram of a signal control board included in the controller of the energy storage apparatus for urban railways using a bidirectional DC-DC converter according to an embodiment of the present invention.

FIG. 4 is a detailed block diagram of a signal control board included in the controller of the energy storage apparatus for urban railways using a bidirectional DC-DC converter according to an embodiment of the present invention.

Referring to FIG. 4, the signal control board (PUZ33) 38 performs communication with another board, the main circuit and a TMS unit and stores general drive information and a malfunction record and also stores state information of each part in an NVSRAM when the energy storage apparatus malfunctions.

Specifically, the PUZ33A board is an interface card for communicating with the PWM33-1 card, the main circuit, and the TMS unit in order to control the energy storage apparatus. This card communicates with the PWM33-1 to receive various information and stores general information, a malfunction record, and the like and communicates with the TMS unit.

This card also regularly stores various state information in the NVSRAM when the energy storage apparatus malfunctions and stores a malfunction record and the like therein. The user may download the stored malfunction record to a PC through RS232 communication between the PC and the card to allow the user to be notified of the state of the energy storage apparatus when the energy storage apparatus malfunctions.

Figure 5:
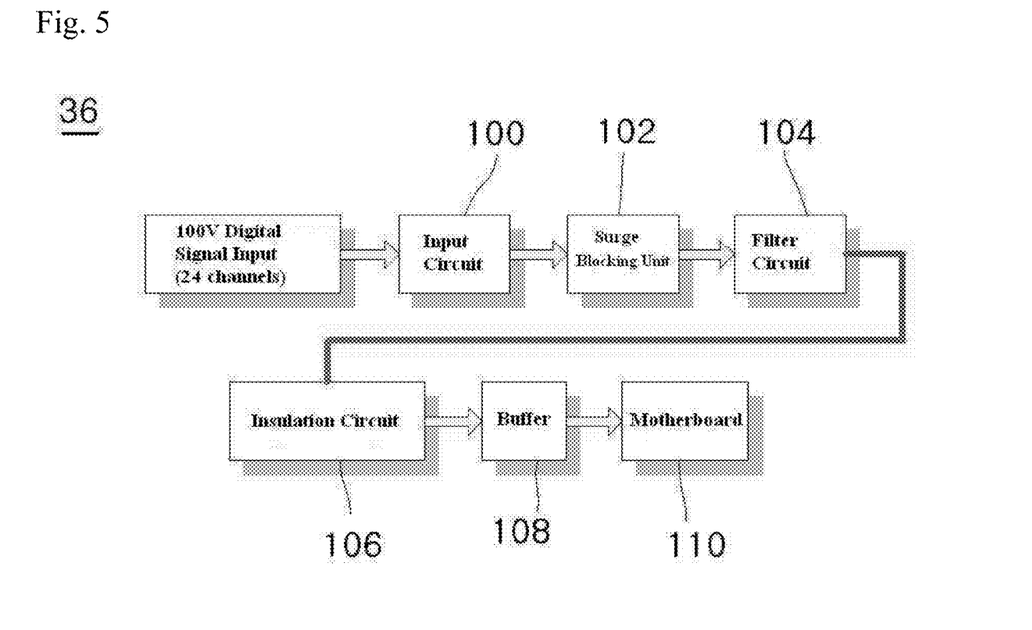
FIG. 5 is a detailed block diagram of a signal identification board included in the controller of the energy storage apparatus for urban railways using a bidirectional DC-DC converter according to an embodiment of the present invention.

FIG. 5 is a detailed block diagram of a signal identification board included in the controller of the energy storage apparatus for urban railways using a bidirectional DC-DC converter according to an embodiment of the present invention.

Referring to FIG. 5, the signal identification board (DIP13 & DIP-AUX) 36 includes an input circuit 100, a surge blocking unit 102, a filter circuit 104, and an insulation circuit 106. The input circuit 100 receives a 100V input signal. The surge blocking unit 102 is connected to an output terminal of the input circuit 100 to block surge in the input signal. The filter circuit 104 filters an output signal of the surge blocking unit 102. The insulation circuit 106 insulates this board from external signals.

Specifically, the DIP13-1/DIP-AUX board includes a digital input circuit 100 for receiving a 100V input signal, a surge blocking circuit for blocking surge in the input signal, a filter circuit for performing filtering, and an insulation circuit for providing insulation from external signals.

The DIP13-1 board is designed to receive digital signals of a total of 24 channels and the DIP-AUX board is designed to receive digital signals of 8 channels. The received signals are transmitted to the PUZ33A board through a motherboard and are then used for control.

Figure 6:
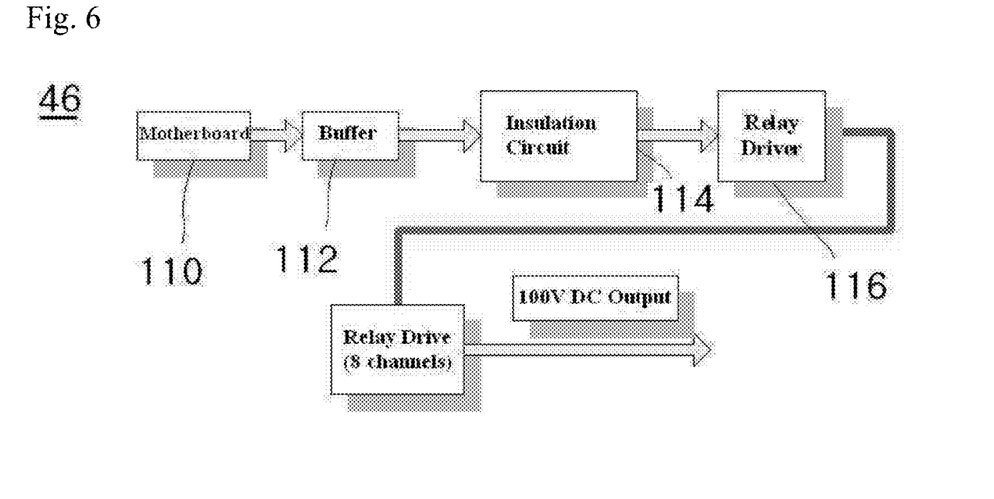
FIG. 6 is a detailed block diagram of a digital output contact portion included in the controller of the energy storage apparatus for urban railways using a bidirectional DC-DC converter according to an embodiment of the present invention.

FIG. 6 is a detailed block diagram of a digital output contact portion included in the controller of the energy storage apparatus for urban railways using a bidirectional DC-DC converter according to an embodiment of the present invention.

Referring to FIG. 6, the digital output contact portion (RYO45) 46 includes an insulation circuit 114 for separating output signals of the motherboard 110 from external signals and a relay driver 116 for driving a contactor relay.

The digital output (RYO45) board includes a power separation circuit for separating output signals from external power and a relay circuit for driving the contactor relay.

The controller 32 of the energy storage apparatus includes 8-channel digital output circuits to drive each contactor of the energy storage apparatus or to externally output digital signals.

Figure 7:
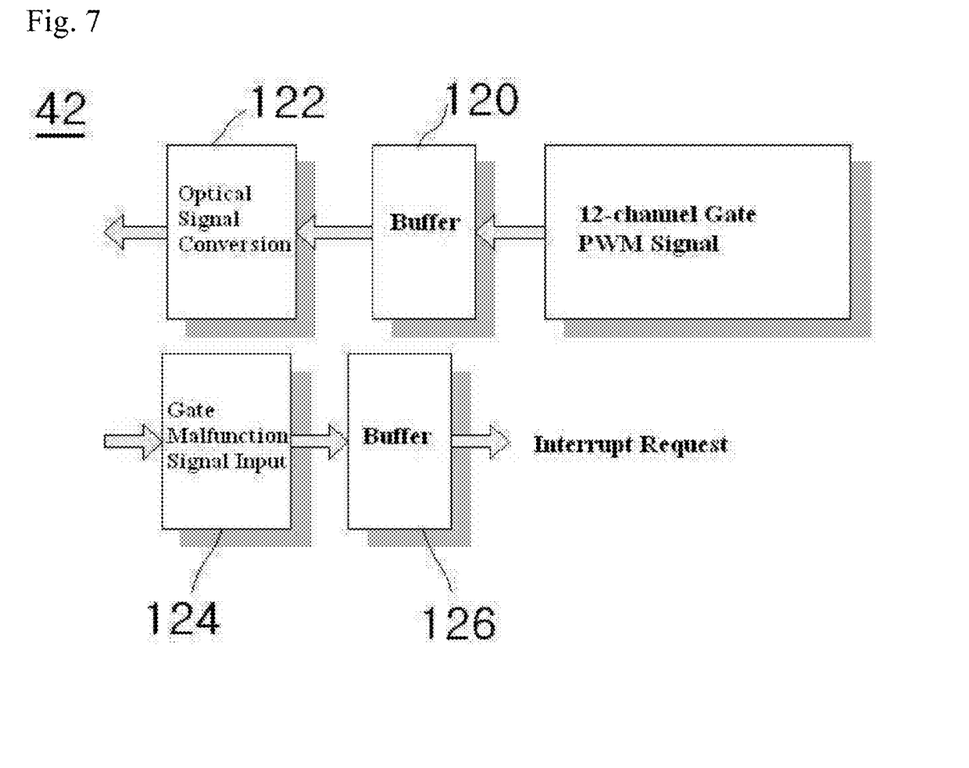
FIG. 7 is a detailed block diagram of an optical output board included in the controller of the energy storage apparatus for urban railways using a bidirectional DC-DC converter according to an embodiment of the present invention.

FIG. 7 is a detailed block diagram of an optical output board included in the controller of the energy storage apparatus for urban railways using a bidirectional DC-DC converter according to an embodiment of the present invention.

Referring to FIG. 7, the optical output board (EOC09-1) 42 includes an optical signal converter 122 that receives 12-channel gate PWM signals from the PWM control board 40 and converts the same into optical signals to drive the gate driver 44, thereby turning the IGBT on or off.

That is, the EOC09-1 board receives 12-channel gate PWM signals from the PWM33-1 unit and converts the same into optical signals to drive the gate driver, thereby turning the IGBT on or off.

Figure 8:
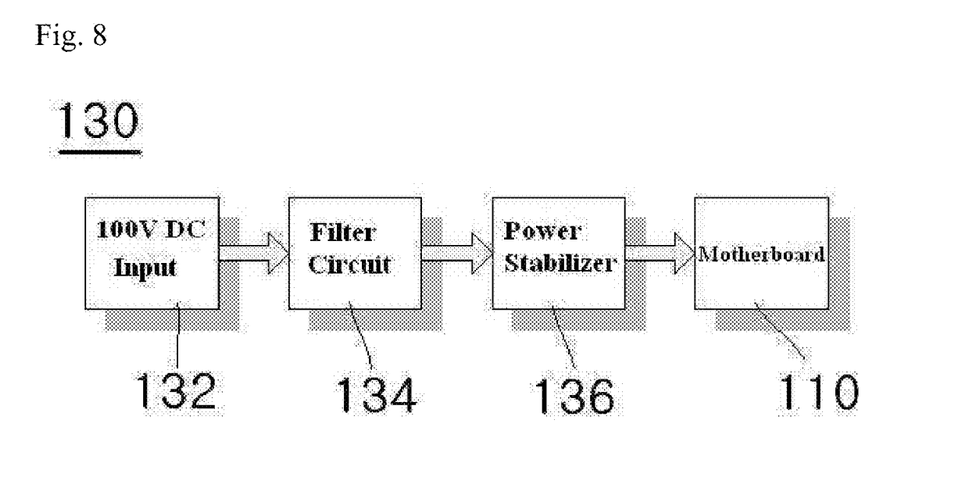
FIG. 8 is a detailed block diagram of a power input board included in the controller of the energy storage apparatus for urban railways using a bidirectional DC-DC converter according to an embodiment of the present invention.
Figure 9:
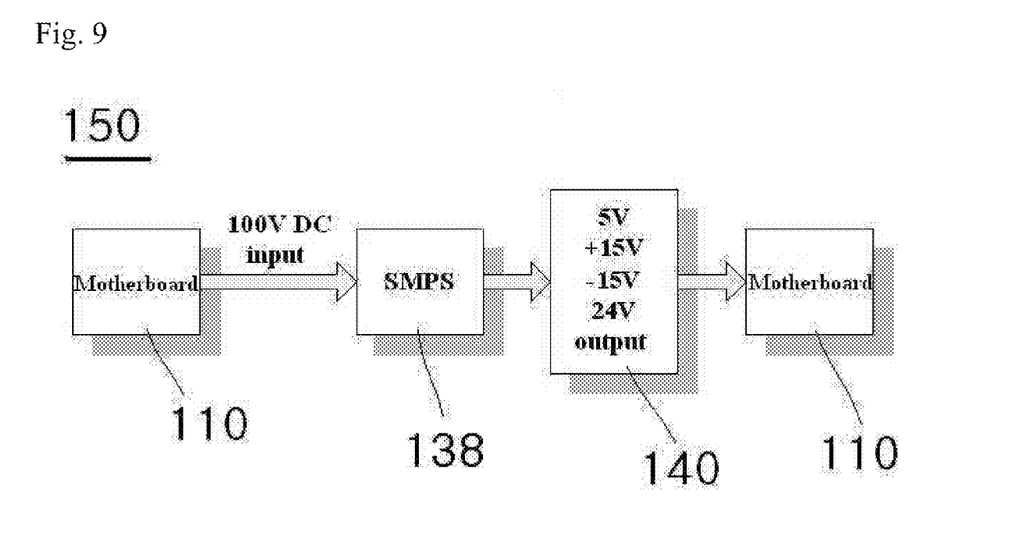
FIG. 9 is a detailed block diagram of a power control board included in the controller of the energy storage apparatus for urban railways using a bidirectional DC-DC converter according to an embodiment of the present invention.

FIG. 8 is a detailed block diagram of a power input board included in the controller of the energy storage apparatus for urban railways using a bidirectional DC-DC converter according to an embodiment of the present invention and FIG. 9 is a detailed block diagram of a power control board included in the controller of the energy storage apparatus for urban railways using a bidirectional DC-DC converter according to an embodiment of the present invention.

Referring to FIGS. 8 and 9, the power input board (PWS24A) 130 included in the controller 32 receives DC 100V and inputs the same to the motherboard through a filter circuit and a power stabilization circuit to provide the same to the PWS27 board which is a control power unit.

The PWS27 board receives DC 100V from the PWS24 board and generates and provides control power required for each controller component through a Switch Mode Power Supply (SMPS).

Figure 10:
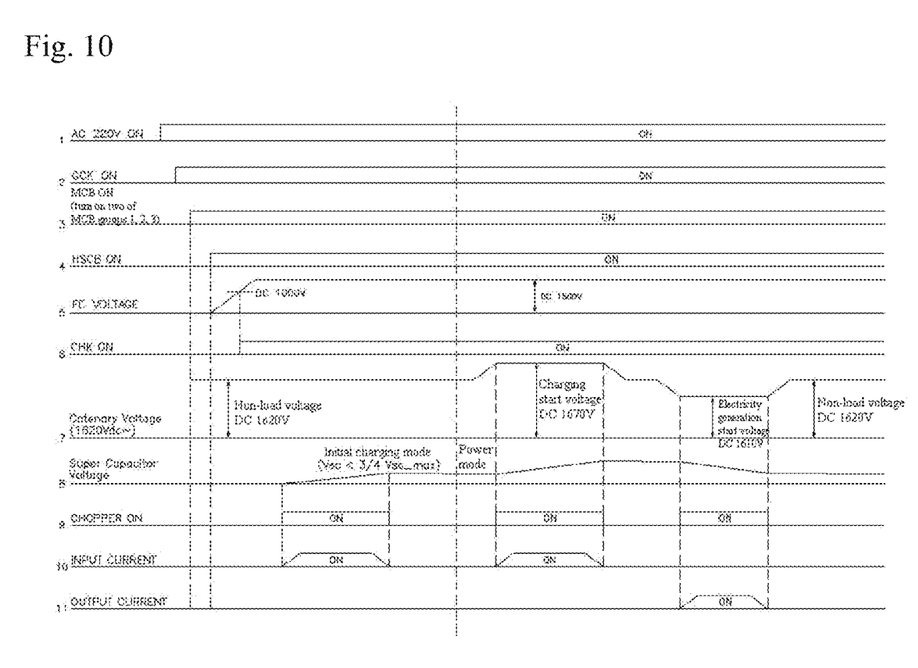
FIG. 10 is an operation sequence diagram of the energy storage apparatus for urban railways using a bidirectional DC-DC converter according to an embodiment of the present invention.

FIG. 10 is an operation sequence diagram of the energy storage apparatus for urban railways using a bidirectional DC-DC converter according to an embodiment of the present invention.

Referring to FIG. 10, first, when 220V AC power is applied to the controller 32 included in the energy storage apparatus for urban railways using a bidirectional DC-DC converter according to an embodiment of the present invention, the controller 32 starts operation and sequentially activates GCK, MCB, and HSCB units at short intervals when each contactor is in normal state.

When FC voltage exceeds a reference voltage, a CHK unit is turned on to enter an initial charging mode of the supercapacitors for charging and discharging.

In the initial charging mode, an operation for protecting the supercapacitor from surge current is performed as described above.

When initial charging is completed, the controller identifies the operating mode of the supercapacitors according to a voltage state of the overhead line and performs a normal operation by alternately driving the bidirectional DC-DC converters in a buck mode and a booster mode.

As is apparent from the above description, an energy storage apparatus for urban railways using a bidirectional DC-DC converter according to the present invention has advantages in that it is possible to easily add a storage unit including supercapacitors in the form of a box module as capacity increases or changes and it is possible to achieve accurate and efficient charging and discharging of the storage unit through various sensors and signal checks (inspections).

The energy storage apparatus for urban railways using a bidirectional DC-DC converter according to the present invention is not limited to the above embodiments and may be modified into various forms without departing from the spirit of the present invention.

What is claimed is:

1. An apparatus comprising:
   a power receiving unit constructed to be electrically connected to an overhead line and to receive power, the power receiving unit comprising a disconnector;
   a filter unit constructed to be electrically connected to the overhead line and to cut-off high frequency components;
   a charging unit constructed to be electrically connected between the overhead line and the filter unit and to prevent excess current from flowing into the filter unit during charging a capacitor of the charging unit, wherein the charging unit includes a block switch constructed to turn an electrical connection between the charging unit and the overhead line on and off;
   at least one storage unit including a plurality of super-capacitors constructed for storing electrical energy, wherein the at least one storage unit is constructed to output power;
   at least one capacitor monitoring unit constructed for measuring capacity of input/output currents and to send a result of monitoring to a controller;
   a plurality of bidirectional DC-DC converters arranged in parallel, where the bidirectional DC-DC converters are electrically connected between the filter unit and the storage unit, the plurality of bidirectional DC-DC converters constructed to control via turning on or off first to sixth transistors via a control signal, wherein two transistors of each bidirectional DC-DC converter are electrically coupled via an inductor and a shunt to a super-capacitor of the plurality of super-capacitors;
   a voltage detector electrically connected to the filter unit, the voltage detector constructed to detect a voltage of the overhead line; and
   a current detector constructed to detect an amount of current flowing into the filter unit and to output current to the controller, where the controller is constructed to receive a current signal from the current detector, a voltage signal from the voltage detector, and to output an on/off control signal to each of the first to sixth transistors of the bidirectional DC-DC converters;
   wherein, said apparatus is constructed for urban railway energy storage via said plurality of bidirectional DC-DC converters.

2. The apparatus according to claim 1, wherein each capacitor monitoring unit is electrically coupled to a separate bidirectional DC-DC converter of the plurality of bidirectional DC-DC converters.

3. The apparatus according to claim 1, wherein each storage unit is electrically coupled to a separate bidirectional DC-DC converter of the plurality of bidirectional DC-DC converters.

4. The apparatus according to claim 1, wherein the controller further comprises;
   an analog interface board constructed to receive a detected DC link voltage and a supercapacitor voltage in real time from a PT unit, a DC link current, and a supercapacitor charging and discharging current from a CT unit;
   a signal identifying board, which is in parallel to said analog interface board constructed to identify feedback signals of contactor, fuse contact, temperature contact, and switch contact of a front panel and constructed to perform a drive sequence and guard operation of the controller;
   a signal control board constructed to receive signals from the analog interface board and the signal identifying board, and constructed to perform a sequence, guiding operation and constructed to communicate the operation of the apparatus;
   a digital output contact unit constructed to receive a signal from the signal control board and to output a contact signal;
   a communication board constructed to receive a first signal from the signal control board, to perform communication with a GP monitor, and to communicate to the supercapacitor monitoring unit;
   a PWM control board constructed to receive a second signal from the analog interface board and the signal control board and to provide a PWM pulse signal;
   an optical output board constructed to receive the PWM pulse signal from the PWM control board and to convert the PWM pulse signal into a PWM optical signal; and
   an external gate driver constructed to receive the PWM optical signal from the optical output board and to generate an external gate drive signal.

5. The apparatus according to claim 4, wherein the PWM control board further comprises:
   a sensor input circuit constructed to receive an analog signal,
   an A/D converter constructed to convert a first output signal from the sensor input circuit to a digital signal,
   a calculation unit constructed to receive, as inputs, a reference malfunction value and a second output signal of the sensor input circuit, and is constructed to output a malfunction detection signal and an interrupting request signal,
   a calculation control processor constructed to receive an output signal of the calculation unit, and constructed to create a charge and discharge current instruction, generate a pulse pattern of a bidirectional chopper, and control a duty ratio of the bidirectional chopper, and
   a power monitoring unit constructed to monitor the power state.

6. The apparatus according to claim 4, wherein the signal control board is constructed to perform communication with another board, a main circuit, and a TMS unit and store general drive information and a malfunction record, and store state information of each part in an NVSRAM, in case of malfunction of the apparatus.

7. The apparatus according to claim 4, wherein the signal identifying board further comprises:
   an input circuit constructed to receive a 100V input signal;
   a surge blocking unit constructed to connect to an output terminal of the input circuit and to block surges in the input signal;
   a filter circuit constructed to filter the output signal of the surge blocking unit; and
   an insulation circuit constructed to insulate the signal identifying board from external signals.

8. The apparatus according to claim 4, wherein the digital output contact unit further comprises:
   an insulation circuit constructed to separate output signals of a motherboard from external signals; and
   a relay driver constructed to drive a contactor relay.

9. The apparatus according to claim 4, wherein the optical output board further comprises:
   an optical signal converter constructed to receive 12-channel gate PWM signals from the PWM control board, and convert same into optical signals to drive the external gate driver to turn a corresponding IGBT on or off.

10. The apparatus according to claim 1, wherein the controller is constructed to sequentially activate a GCK, MCB, and HSCB units when a 220V AC power is applied to the controller and each contactor is in a normal state, and turn a CHK unit on to enter an initial charging mode of the supercapacitors for charging and discharging when a FC voltage exceeds a reference voltage, and identify when initial charging is completed, an operating mode of the supercapacitors according to a voltage state of the overhead line and alternately drive the bidirectional DC-DC converters in a buck mode and a booster mode.

* * * * *